A. HALLSTROM.
FOUR-HORSE EVENER.
APPLICATION FILED MAR. 3, 1911.
1,076,572.
Patented Oct. 21, 1913.
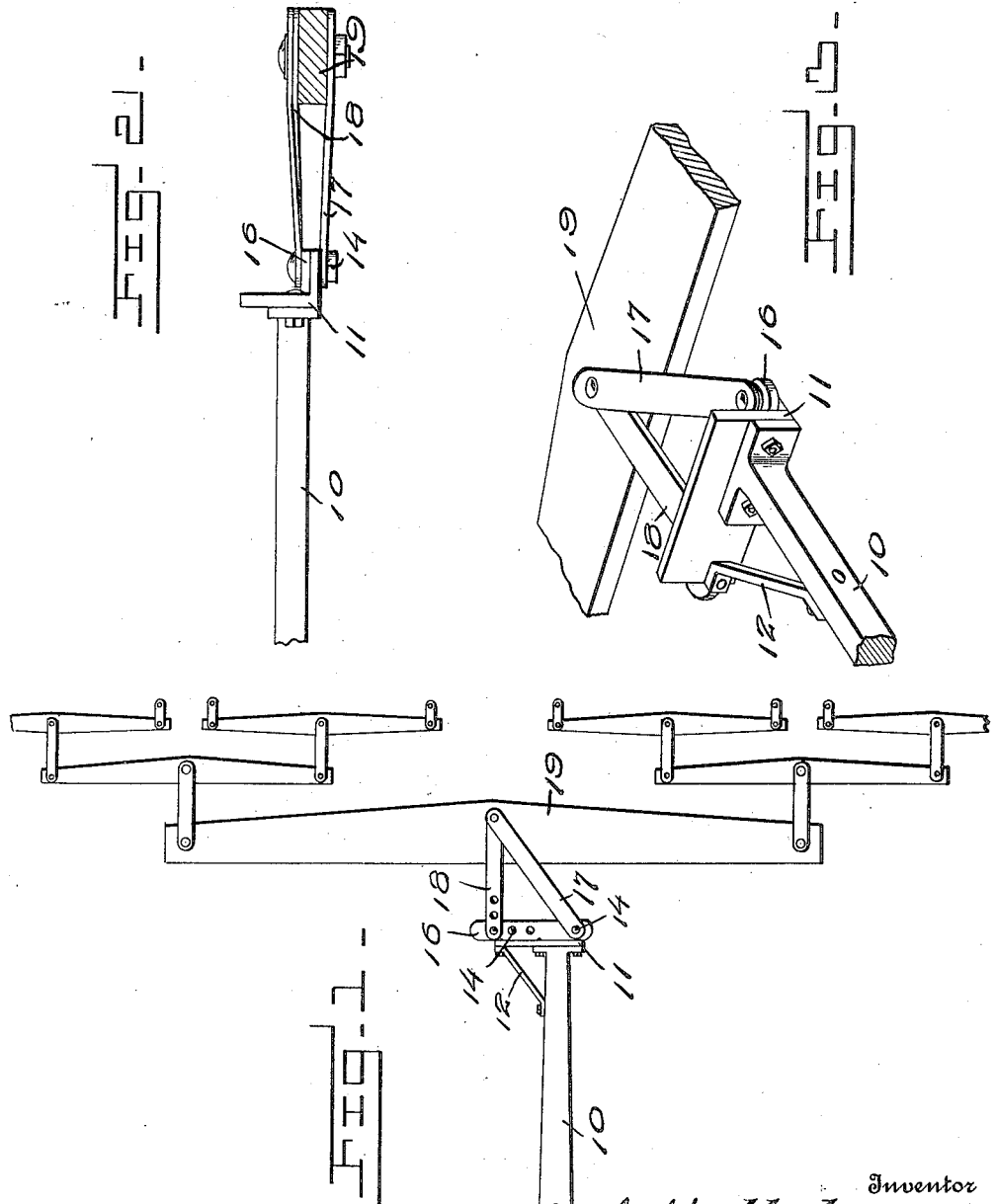
Inventor
A. Hallstrom,
Witnesses
By Harry Ellis Chandlee
Attorney

UNITED STATES PATENT OFFICE.

ALBERT HALLSTROM, OF FAIRMONT, MINNESOTA.

FOUR-HORSE EVENER.

1,076,572.  Specification of Letters Patent.  Patented Oct. 21, 1913.

Application filed March 3, 1911. Serial No. 612,026.

*To all whom it may concern:*

Be it known that I, ALBERT HALLSTROM, a citizen of the United States, residing at Fairmont, in the county of Martin and State of Minnesota, have invented certain new and useful Improvements in Four-Horse Eveners, of which the following is a specification.

This invention relates to an improvement in draft-eveners.

The primary object of said invention is to provide a device of this character for equalizing the draft of four draft animals, said device being of such construction as may be readily assembled and economically manufactured.

Other objects and advantages will be apparent from the following description, and it will be understood that changes in the specific structure shown and described may be made within the scope of the claim without departing from the spirit of the invention.

In the drawings: Figure 1 is a top plan view of the device, Fig. 2 an edge view, and Fig. 3 a detail perspective of the connection of the plow clevis and the main draft bar.

In the drawing the numeral 10 designates a plow beam having bolted to its outer end, and in offset relation thereto an angle attaching bar 11, comprising a horizontal web and a vertical web. A bracket 12 is provided and has its outer end secured to one end of the attaching bar, and its other end to the beam 10 so that the attaching bar will be rigidly braced. Secured to the attaching bar 11 by bolts 14 is a clevis bar 16, the same being provided with a series of perforations which register with similar perforations formed in the horizontal web of the attaching bar to permit the passage of the bolts through certain of the same. Pivotally connected one to one end of the bar 16 and one to the under side of the horizontal web, and by one of the bolts 14 are the inner ends of links 17, the outer ends of which being pivotally connected to the main draft bar 19 and at the central portion thereof. A third link 18 is secured at one end to the opposite end of the clevis bar 16 and at the other end of the draft bar 19 at the same point with the links 17. The inner end of the link 18 is formed with a series of alined perforations which are adapted to successively engage one end of the clevis bar 16, whereby the proper adjustment may be obtained to regulate the strain upon the draft animals.

It will be noted by the peculiar positioning of the links 17 and 18, and their connection with the clevis 11 that the combined draft of all of the animals will be directed to the end portion of the clevis. It will therefore be seen that three of the draft animals may walk on the land side and allow the fourth to walk in the furrow, the draft being applied as stated, directly to the beam, thus preventing the side draft which usually occurs when the animals are driven in this manner.

Particular attention is called to the peculiar manner in which the link 18 is adjustable on the bar 16 (near the outer fulcrum pin of the draft), said adjustment being made as the number of horses is increased or decreased.

What is claimed is:

In a draft evener, an angle attaching bar comprising a horizontal web and a vertical web, the latter for attachment at one end to a plow beam, a clevis bar adjustably secured on said horizontal web, and provided with a plurality of adjusting openings, a pair of links secured one to one end of the clevis bar and one to the horizontal web of the attaching bar and a common securing means for the adjacent ends of said links, clevis bar, and horizontal web, and a third link secured to the opposite end of the clevis bar, last said link provided with a plurality of adjusting openings, and a draft bar to which the outer ends of the links are pivoted at the same point.

In testimony whereof I affix my signature, in the presence of two witnesses.

ALBERT HALLSTROM.

Witnesses:
 JOHN P. MADAY,
 WILLIAM DOYLE.

Copies of this patent may be obtained for five cents each, by addressing the "Commissioner of Patents, Washington, D. C."